United States Patent Office
3,679,593
Patented July 25, 1972

3,679,593
STRIPPING OF CONDENSATION POLYMERS WITH AN ALKOXIDE
Charles N. Hansen, Salt Lake City, Morris D. Young, Ephraim, and James E. Granger, Provo, Utah, assignors to Wasatch Chemical Company, Salt Lake City, Utah
No Drawing. Filed Jan. 24, 1969, Ser. No. 793,874
Int. Cl. C09d 9/00
U.S. Cl. 252—170    6 Claims

ABSTRACT OF THE DISCLOSURE

Methods and compositions for stripping or removing condensation polymers from a substrate, whereby the amide or ester linkages of said polymer are cleaved by a transesterification reaction using an alcoholic solution of an alkali metal catalyst.

BACKGROUND OF THE INVENTION

Field of the invention

This invention relates to a method for removing a resinous coating from a substrate and to compositions thereof. More particularly, this invention relates to processes and compositions for stripping polyester, polyacrylates, or polyamide type coatings or pottings from various substrates.

Description of the prior art

Various types of condensation polymers, including polyurethanes, polyamides, polyacrylates and alkyd polyesters, are commonly used for coating metallic components, electrical parts, conductors, and a wide variety of other metallic and electrical substrates, in order to provide protection, insulation or decoration. While the techniques for coating these types of materials are well established, subsequent stripping or removal of these coatings has presented many difficulties. Particularly, these prior art stripping techniques often cause severe damage to the underlying metal by corrosion, pitting or hydrogen embrittlement.

According to one technique of condensation polymer removal, the coating is treated with a strong acid or strong base so as to cause hydrolysis or alcoholysis fractioning of the ester or amide linkage. These systems, however, have proven to be highly disadvantageous, since, as the primary reaction proceeds and the coating is removed, the acid or base is left free to attack the more reactive underlying metal.

Many of these prior art techniques use aqueous caustic alkali such as a water solution of sodium or potassium hydroxide. In these systems, the hydroxide itself effects rupture of the bonding system by alcoholysis and the underlying substrate is laid bare subject to severe corrosion. While it is recognized that the actual extent of corrosion is determined by the type of metal forming the substrate, whether a soft, easily corrodible metal such as aluminum, or an inert more difficulty corrodible metal such as platinum, it would be desirable to provide a technique and composition which can be more generally used for the removal of condensation-type polymers regardless of the specific nature of the underlying metal.

SUMMARY OF THE INVENTION

Accordingly, it is an object of this invention to provide a technique and composition for removing a resinous coating from a substrate. It is further an object of this invention to provide a method and composition for removing a condensation-type polymer coating from a metallic substrate. More particularly, it is an object of this invention to provide a method and composition for quickly removing condensation-type polymers including polyurethane, polyacrylate, polyamide or alkyd polyester type coatings from metallic substrates while at the same time leaving the underlying metal clean, non-corroded and generally undamaged.

These and other objects have now been accomplished by treating the coating with an alcoholic solution of an active metal alkoxide selected from the group of alkali metals, aluminum, magnesium, and combinations thereof. By this technique, transesterification of the polymer is effected and the remaining product is easily removed by simple washing.

DETAILED DESCRIPTION OF THE INVENTION

Unlike the alkali hydroxide/water systems of the prior art, wherein the hydroxide acts as a reactant and water acts as a solvent in an alcoholysis reaction, when using the present composition, the alcohol is the reactant and the solvent, and the alkoxide is the catalyst in a transesterification reaction.

Surprisingly, it has been found that in these types of systems, the alkali metal can be present in concentrations of from the saturation point in the solvent to about 1% by weight of the solvent, and for all surfaces less chemically active than magnesium, there will be little or no attack of the metal substrate.

The alkoxides of the present invention may be formed from the metals of the active metal series such as lithium, sodium, potassium, rubidium, cesium, or combinations thereof. Alternatively, the alkoxide catalysts of the present invention may comprise admixtures of any of these active metal alkoxides in combination with aluminum alkoxide or magnesium alkoxide. If desired and for special purposes where a slow transesterification reaction is preferred, an aluminum alkoxide or a magnesium alkoxide catalyst can be used alone without the addition of an alkali metal alkoxide.

The alcohol reactant for the formation of the alkoxide may be selected from the group of lower aliphatic alcohols including methanol, ethanol, propanol, butanol and heptanol.

One preferred method for forming the alkoxide is to react the alcohol with previously cleaned pieces of magnesium to form a magnesium alkoxide. The newly formed magnesium alkoxide is then suspended in a solvent and a stoichiometric quantity of an alkali metal hydroxide is added with heat until the formation of a magnesium hydroxide precipitate occurs. The precipitate can then be easily separated from the desired alkali metal alkoxide.

Another method for forming the alkoxide is to simply react the free state alkali metal with the alcohol. Where the alcohol is of a higher molecular weight, heat can be applied to accelerate the reaction.

The alkoxide is then dissolved in a polar solvent such as a lower aliphatic alcohol or methylene chloride. Where the polar solvent is not an alcohol, the solution of the alkoxide and the polar solvent is admixed with an alcohol so that the concentration of the alkoxide in the solvent ranges from between the saturation point to about 1% by weight. It should be noted that the order of addition of the alcohol and the polar solvent is not critical and if desired, the polar solvent can be added to a combination of the alcohol and the alkoxide.

Where the polar solvent is an alcohol, however, the alkoxide need only be added to the alcohol in a quantity sufficient to bring the concentration of the alkoxide to the desired level. For the purposes of this invention, any polar solvent, other than water, can be used in forming the alkoxide solution so long as it does not react with the alkoxide.

When an amine base solvent is used, aminolysis can occur along with or in place of the primary transesterification reaction.

Suitable alcohols for effecting the transesterification of the condensation-type polymer, include the lower aliphatic alcohols, such as methanol, ethanol and propanol. Although larger moleculer weight alcohols are suitable solvents, because of their slow transesterification reaction, they are not generally considered to be preferred.

If desired, one or more corrosion inhibitors can be added to the system for application where the metal substrate is particularly prone to base attack and corrosion. Various types of inhibitors can be used, for example a combination of sodium benzoate and sodium nitrate has been found to be an effective inhibitor. Other good inhibitors include Petronate HL, a sulfonated oil produced by Sonneborn Corporation, and monochloroacetic acid. In general, the best inhibitors are those which are capable of forming a coating over the substrate.

The inhibitor can be present in the alcoholic solution in quantities of between 0.2% by weight to 6.0% by weight of the total stripping composition depending upon the particular inhibitor and nature of the metal being treated. For monochloroacetic acid the preferred range is from 3.0–6.0% by weight. For a sulfonated oil, the preferred range is from 0.5% to the limit of solubility. When the combination of sodium benzoate and sodium nitrite is used, it is preferable that each be present in amounts of from 0.2% to 1.0% by weight. Above these preferred concentrations, the inhibiting action of these materials continues to be effective, but to no greater an extent than at lower concentrations.

A water absorbing material may be incorporated into the alkoxide solution as a protection against the presence of residual water. Residual water can cause the alkoxide to revert to the hydroxide which is slower acting and more corrosive. Suitable water absorbing materials include the magnesium alkoxides, such as magnesium methoxide, or sodium hydrosulfide. Normally, no more than between 0.5 to 1.0% by weight of the water absorbing material need be present to provide adequate protection against water.

The present composition can best be seen by reference to certain specific examples. It should be clearly understood however, that these examples are presented here for purposes of illustration only and are not intended to be limiting in any manner. All parts are expressed by parts by weight.

Example 1

10 parts of potassium methoxide is added to 89 parts of methanol. 1 part of magnesium methoxide is added to the solution and the mixture is stirred until the methoxides are completely dissolved in the alcohol. The solution can then be used for the removal of a polyurethane coating. This is accomplished by dipping the coated article into an ultrasonic bath of the stripping composition at a temperature of about 40° C.

Example 2

10 parts of sodium methoxide are added to 87 parts of methanol and 3 parts of Petronate HL inhibitor. The mixture is stirred until the methoxide is completely dissolved in the alcohol. This solution can be used to remove a polymer coating as indicated in Example 1.

Example 3

10 parts of potassium ethoxide are admixed with 87 parts of ethanol and 3 parts of Petronate HL inhibitor. After the ethoxide is completely dissolved, the solution can be used to remove a polymer coating as indicated in Example 1.

Example 4

10 parts of sodium methoxide are admixed with 30 parts of methanol, 57 parts of methylene chloride and 3 parts of Petronate HL. Upon complete dissolution, the solution can be used for removal of a polymer coating as indicated in Example 1.

These compositions will remove a wide variety of condensation type polymers by a transesterification mechanism. The only limitation is that those condensation polymers which exhibit significant steric hinderance or which are characterized by a significant polar ester bond are unlikely to be broken down by the attacking alkoxide ion. Compositions which can be removed by the techniques of this invention include the polyurethane coatings, polyacrylate and the alkyd polyesters formed by the condensation reaction of a polyhydric alcohol and a polycarboxylic acid and the various polyamide coatings.

To cleave these various types of polymers, it is only necessary that the coated metal be immersed or otherwise brought into contact with the alcoholic solution. Transesterification will normally occur at room temperature, but agitation and heat will accelerate the process.

The speed of cleaving the carboxylic acid or amide derivatives with the alkoxide varies greatly depending upon the particular metallic ions used and the concentration of the alkoxide in the solvent. In general, the more electropositive the metal ion, the more rapidly transesterification will occur. For example, a 10% potassium methoxide solution is more than five times as reactive as the corresponding sodium methoxide solution. A 10% potassium methoxide solution at room temperature will dissolve a 1 g. cube of ProSeal 777, in approximately 30 minutes while a 10% sodium methoxide solution requires four hours or more.

One of the major factors that seems to retard the stripping action of the alkoxide solution is that a barrier is produced by the material which has already been cleaved, but which is still adhering to the polymer surface. It has been found that this problem can be substantially alleviated by treating the coating under conditions of heat and turbulence. A preferable environment for the alkoxide is an ultrasonic bath at about 40° C.

The non-corrosiveness of the composition of this invention can be demonstrated by a simple corrosion test. Pure copper and aluminum plates are placed in a composition containing 10% potassium methoxide, 89% methanol and 1% magnesium methoxide. After six hours, no discoloration or staining was noted. The weight of each plate was determined before and after immersion. The results of this test are as follows:

|  | Weight of plate, g.— | |
|---|---|---|
|  | Before immersion | After 6 hrs. immersion |
| Copper Plate No. 1 | 3.9529 | 3.9529 |
| Copper Plate No. 2 | 4.0859 | 4.0859 |
| Aluminum Plate No. 1 | 1.2664 | 1.2661 |
| Aluminum Plate No. 2 | 1.2094 | 1.2094 |

Although this invention has been described principally in terms of removing a condensation type polymer from a metal base, it should be clearly understood that the base can be made of any material which is less reactive than magnesium. For example, suitable substrates include rubber or the various plastics as well as metals including iron, steel, aluminum, copper and the like. This invention has particular applicability to metal substrates only because the stripping solution will not corrode the metal while removing the polymer. Moreover, the system of the present invention is useful in removing potted, foamed or molded polymers from a substrate as well as coated polymers.

Having generally described the invention, what is claimed is:

1. A method for removing a condensation polymer from a metallic substrate less chemically active than magnesium which comprises transesterifying said condensation polymer with a lower alkanol solution of an alkali metal alkoxide prepared from a lower alkanol, wherein said alkoxide is present in an amount of from about 1% by weight to the saturation point of said solvent, and separating the transesterification product from said substrate.

2. The method of claim 1 wherein said alkali metal alkoxide is an alkoxide of a metal selected from the group consisting of lithium, sodium, potassium, rubidium, cesium, and combinations thereof.

3. The method of claim 1 wherein said condensation polymer is selected from the group consisting of polyamides, polyacrylates and alkyd polyesters.

4. The method of claim 3 wherein said condensation polymer is a polyurethane polymer.

5. A stripping composition for removing a condensation polymer from a metallic substrate less chemically active than magnesium which consists essentially of a lower alkanol solution of an alkoxide prepared from (a) an alkali metal selected from the group consisting of lithium, sodium, potassium, rubidium, cesium, and combinations thereof, and (b) a lower alkanol; and wherein said alkoxide is present in an amount of from about 1% by weight to the saturation point of said solvent.

6. The stripping composition of claim 5 wherein said lower alkanol solution contains magnesium methoxide in an amount sufficient to absorb residual water.

References Cited

UNITED STATES PATENTS

| 2,445,064 | 7/1948  | Hall et al. | 252—158 |
| 982,524   | 1/1911  | Patty       | 252—170 |
| 1,606,618 | 11/1926 | Ellis       | 252—170 |
| 2,479,628 | 8/1949  | Kuentzel    | 252—170 |

OTHER REFERENCES

Morrison et al.: Organic Chemistry, Allyn & Bacon, Inc., p. 489.

LEON D. ROSDOL, Primary Examiner

W. E. SCHULZ, Assistant Examiner

U.S. Cl. X.R.

134—38